(12) United States Patent
Yeh

(10) Patent No.: US 9,188,306 B2
(45) Date of Patent: Nov. 17, 2015

(54) OPTICAL ASSEMBLY OF AN ALERT LIGHT

(71) Applicant: Neng-Chen Yeh, Tainan (TW)

(72) Inventor: Neng-Chen Yeh, Tainan (TW)

(*) Notice: Subject to any disclaimer, the term of this patent is extended or adjusted under 35 U.S.C. 154(b) by 39 days.

(21) Appl. No.: 14/060,425

(22) Filed: Oct. 22, 2013

(65) Prior Publication Data

US 2015/0109798 A1     Apr. 23, 2015

(51) Int. Cl.
   *G02B 7/02*                  (2006.01)
   *F21V 5/00*                  (2015.01)
   *G02B 3/00*                  (2006.01)

(52) U.S. Cl.
CPC ................ *F21V 5/00* (2013.01); *G02B 3/0075* (2013.01)

(58) Field of Classification Search
CPC ................ G02B 3/00–3/14; G02B 2003/0093; G02B 6/42; G02B 6/43; F21V 5/00–5/08; F21V 1/12; F21V 17/005; F21V 17/04; F21V 17/10–17/20; F21V 31/00–31/04
USPC ................ 362/498, 499, 509–511, 540–542, 362/608–610
See application file for complete search history.

(56) References Cited

U.S. PATENT DOCUMENTS

| 7,712,931 B1* | 5/2010 | Smith | 362/331 |
| 2006/0082999 A1* | 4/2006 | Klein | 362/311 |
| 2011/0194279 A1* | 8/2011 | Kuo | 362/235 |

* cited by examiner

*Primary Examiner* — Elmito Breval
*Assistant Examiner* — Nathaniel Lee
(74) *Attorney, Agent, or Firm* — Tracy M. Helms; Apex Juris, pllc

(57) ABSTRACT

An optical assembly of alert light has two optical halves obtained by symmetrically dividing the optical assembly along an optical reference plane. Each optical half has a base with one side corresponding to the optical reference plane and having a junction surface. A light entrance portion and a light exit portion are on two opposite sides of the optical reference plane. The two optical halves are assembled to form the optical assembly of alert light with the junction surfaces of the two optical halves attached to each other. Accordingly, the structural simplification of the divided optical halves facilitates the molding of the optical halves and reduces limitations in manufacturing the optical halves, thereby satisfying the demands of different light form, light projection angles and product shapes in generating diversified alert lights.

3 Claims, 8 Drawing Sheets

OPTICAL ASSEMBLY OF AN ALERT LIGHT

BACKGROUND OF THE INVENTION

1. Field of the Invention

The present invention relates to an optical assembly, and, more particularly, to an optical assembly of an alert light.

2. Description of the Related Art

As having the advantages of being compact in size, low-power-consuming, and durable, light-emitting diode (LED) has gradually replaced conventional light bulbs to become one of the major lighting sources, and has been extensively applied to the fields of all sorts of lighting applications and alert lights.

As far as the composition of a conventional LED alert light is concerned, the conventional LED alert light includes an LED module and an optical lens module. Depending on the number of LED in the LED module, the optical lens module is integrally formed with multiple lens units. The lens units are sequentially aligned in the form of a straight line. A light entrance end of each lens unit corresponds to an LED of the LED module to thereby constitute an LED alert light.

Although the conventional LED alert light can be applied to products with alert features, the optical lens module of the conventional LED alert light employs multiple integrally-formed lens units, and under the constraint of forming technique, each lens unit of the optical lens module takes the form of a cone with a cone apex angle approximately at 120 degrees. The conical shape of the lens units makes the integrally-formed optical lens module inflexible for significant changes and hard to adapt to the requirements of different forms of light projection. As a result, conventional alert lights can be designed to provide single-side straight-line light projection but fail to provide arced, wavy or annular light projection in response to the demand of diversified alert lights.

SUMMARY OF THE INVENTION

An objective of the present invention is to provide an optical assembly of an alert light for solving the problems of conventional alert lights, that is, optical lens elements are hard to adapt to different light form variations, such as arcuate, annular and wavy forms, because of their integrally-formed structure.

To achieve the foregoing objective, the optical assembly of an alert light has two optical halves obtained by symmetrically dividing the optical assembly along an optical reference plane. Each optical half has a base, a light entrance portion and a light exit portion.

One side of the base corresponds to the optical reference plane and has a junction surface. The two optical halves are assembled to form the optical assembly with the junction surfaces of the two optical halves attached to each other.

The light entrance portion is formed on one side of the base and adjoins the junction surface.

The light exit portion is formed on another side of the base and adjoins the junction surface.

Given the structure of the foregoing optical assembly of alert light, the optical assembly can be symmetrically divided into two separate optical halves along an optical reference plane. The divided optical halves are structurally simplified and therefore facilitate the molding thereof in production and the quality of the finished product. After reducing limitations upon molding specific optical halves, different light form, light projection angle or product shape can be varied according to desired alert feature to make structural changes to the optical assembly on its entirety. Additionally, because of the symmetrical shapes of the two optical halves, light emitted from an alert light having the optical assembly passes through a center line of the light exit portion, thereby generating a uniform light effect.

Other objectives, advantages and novel features of the invention will become more apparent from the following detailed description when taken in conjunction with the accompanying drawings.

DETAILED DESCRIPTION OF THE INVENTION

Figure 1:
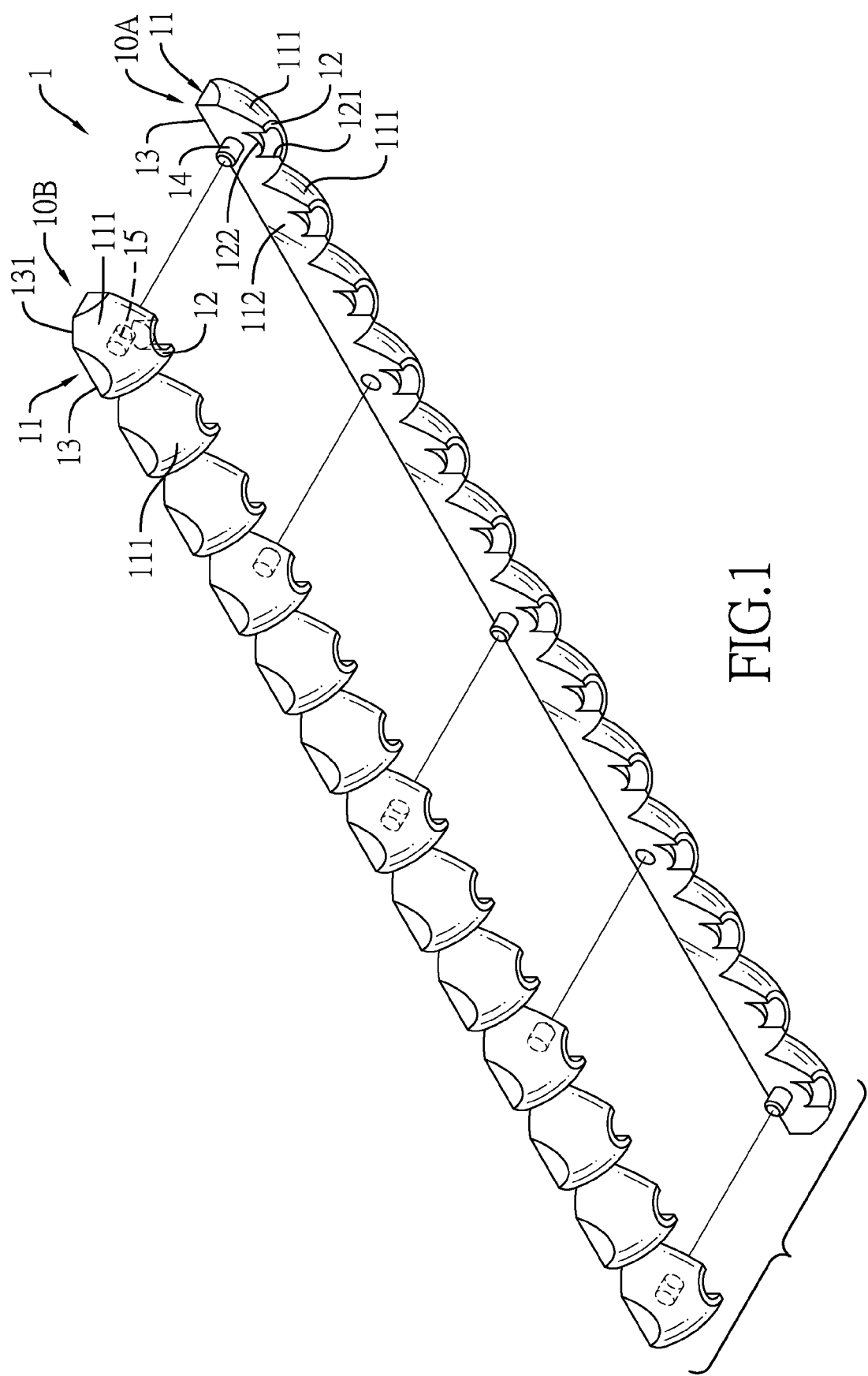
FIG. 1 is an exploded perspective view of a first embodiment of an optical assembly of alert light in accordance with the present invention.
Figure 3:
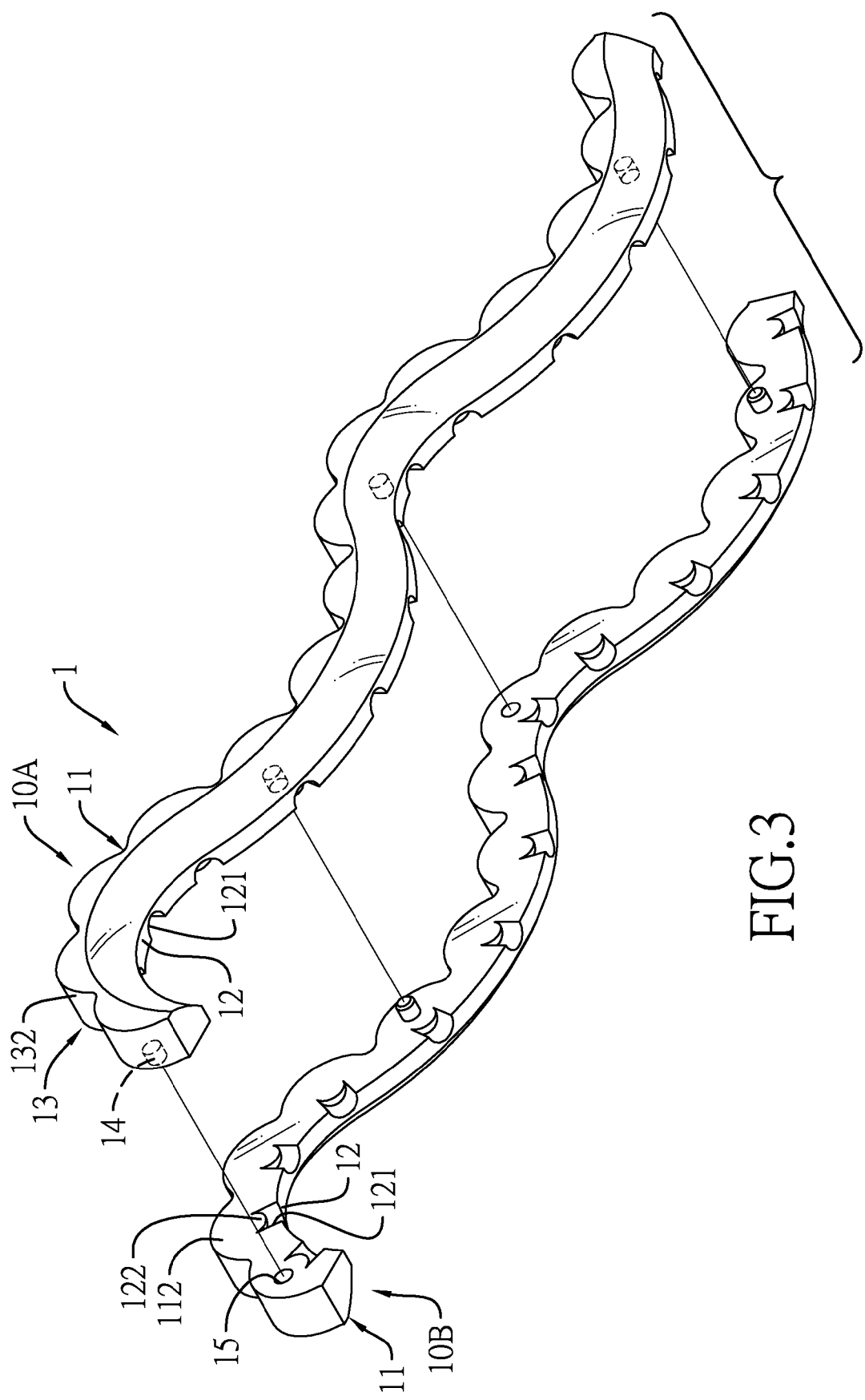
FIG. 3 is an exploded perspective view of a second embodiment of an optical assembly of alert light in accordance with the present invention.
Figure 4:
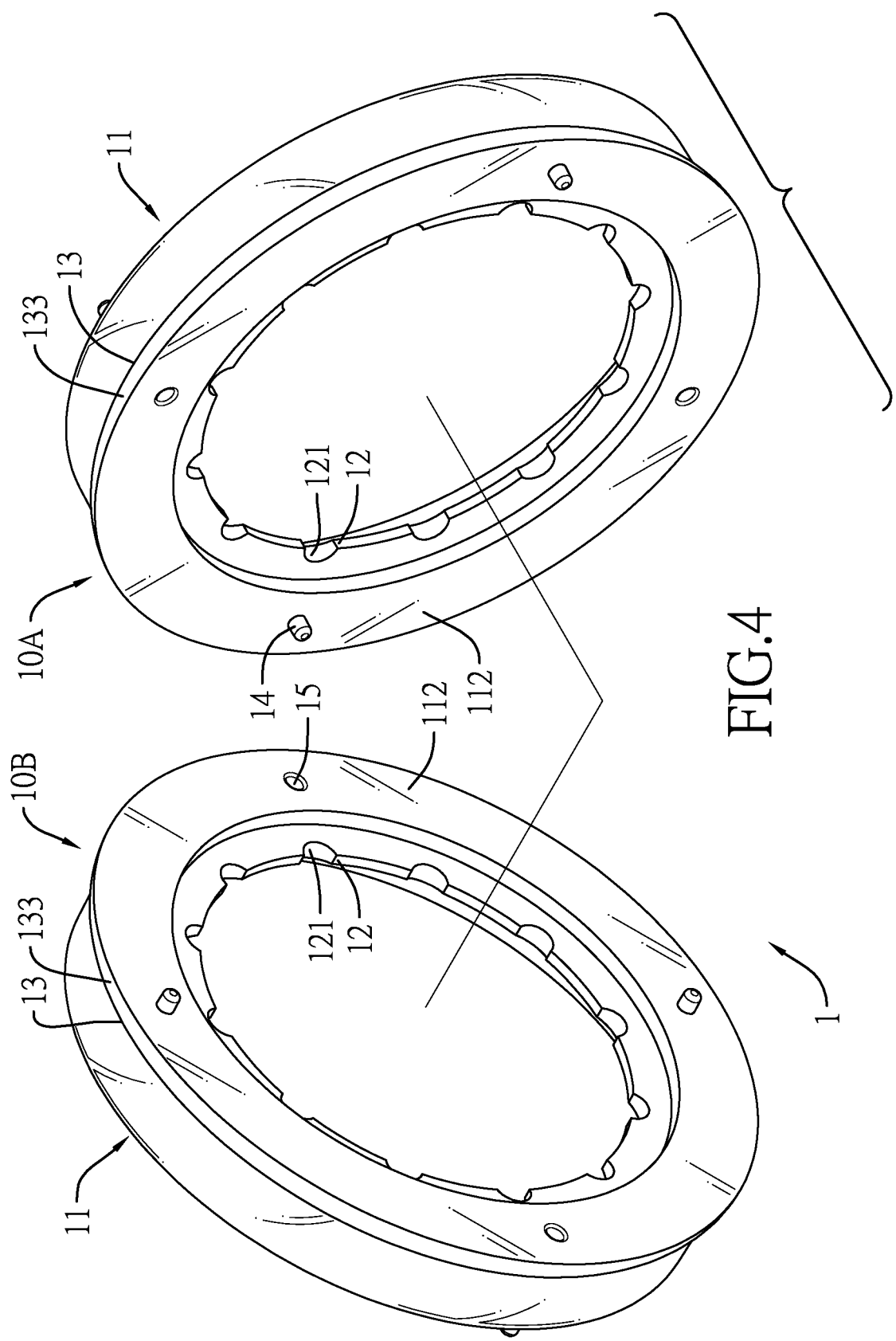
FIG. 4 is an exploded perspective view of a third embodiment of an optical assembly of alert light in accordance with the present invention.
Figure 5:
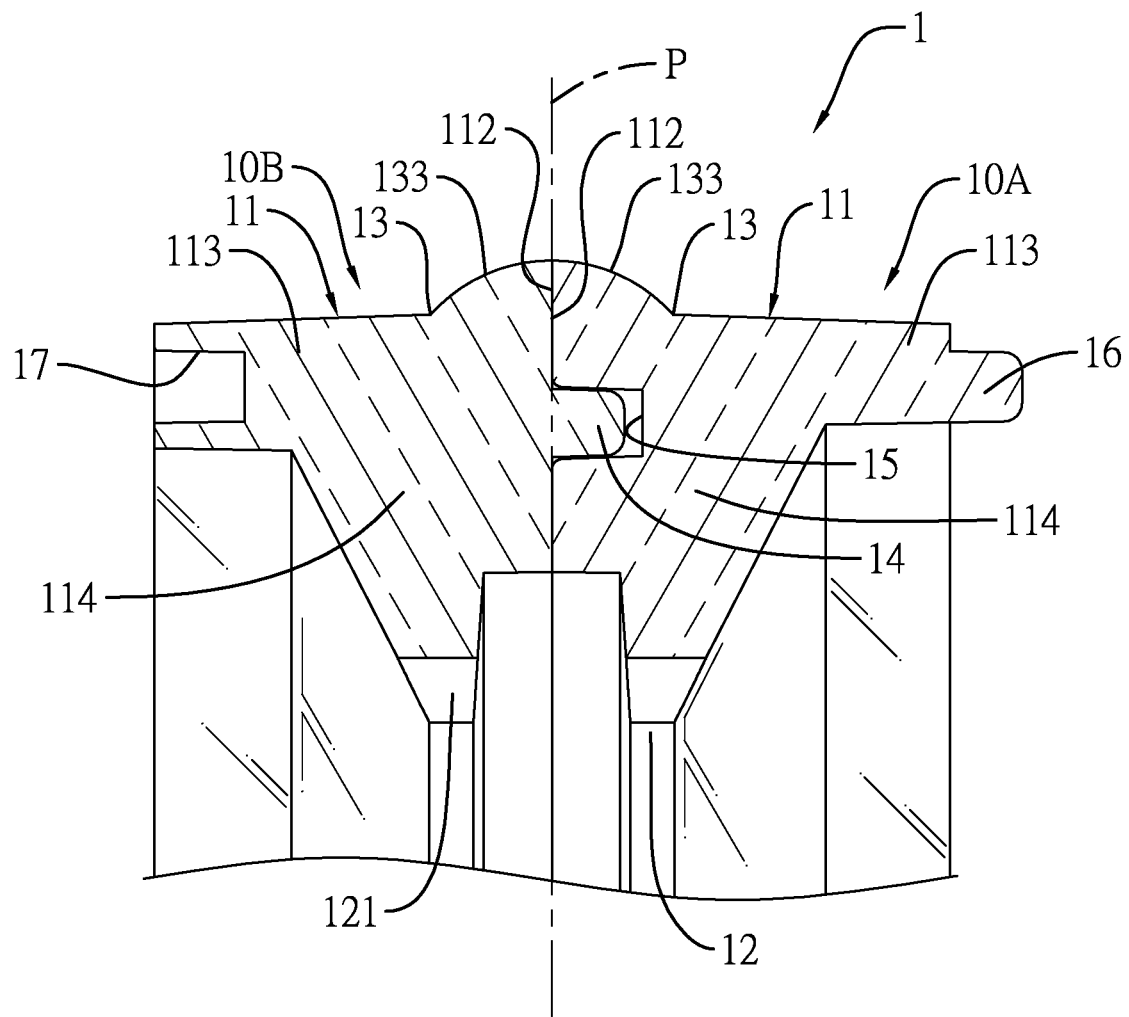
FIG. 5 is a partially-enlarged cross-sectional side view of the optical assembly in FIG. 4.

With reference to FIGS. 1, 3 and 4, three embodiments of an optical assembly of alert light in accordance with the present invention are shown and have common features as follows. Each of the embodiments of the optical assembly of alert light 1 has two separate optical halves 10A, 10B. Each embodiment of the optical assembly has a specific form. The optical halves 10A, 10B are obtained by symmetrically dividing the optical assembly 1 along an optical reference plane 'P' as shown in FIG. 5. The optical reference plane corresponds to a virtual plane defined by center points of multiple light-emitting diodes (LEDs) in an LED module of the alert light. Each optical half 10A, 10B has a base 11, a light entrance portion 12 and a light exit portion 13. One side of the base 11 corresponding to the optical reference plane has a junction surface 112. The light entrance portion 12 is formed on one side of the base 11 and adjoins the junction surface 112. The light exit portion 13 is formed on another side of the base 11, adjoins the junction surface 112, and is opposite to the light entrance portion 12. The two optical halves 10A, 10B are made of a transparent material, which may be glass, polymethylmethacrylate (PMMA), and the like. The optical halves 10A, 10B respectively have at least one first jointing member 14 and at least one second jointing member 15 respectively formed on at least one position on the base 11 of the optical halve 10A and on at least one position on the base 11 of the optical halve 10B. The first jointing member 14 and the second jointing member 15 are respectively a raised portion and a recessed portion matching each other. The two optical halves 10A, 10B are assembled together by correspondingly engaging the at least one first jointing member 14 and the at least one second jointing member 15 with the junction surfaces of the two optical halves 10A, 10B attached to each other for forming the optical assembly of alert light 1.

Figure 2:
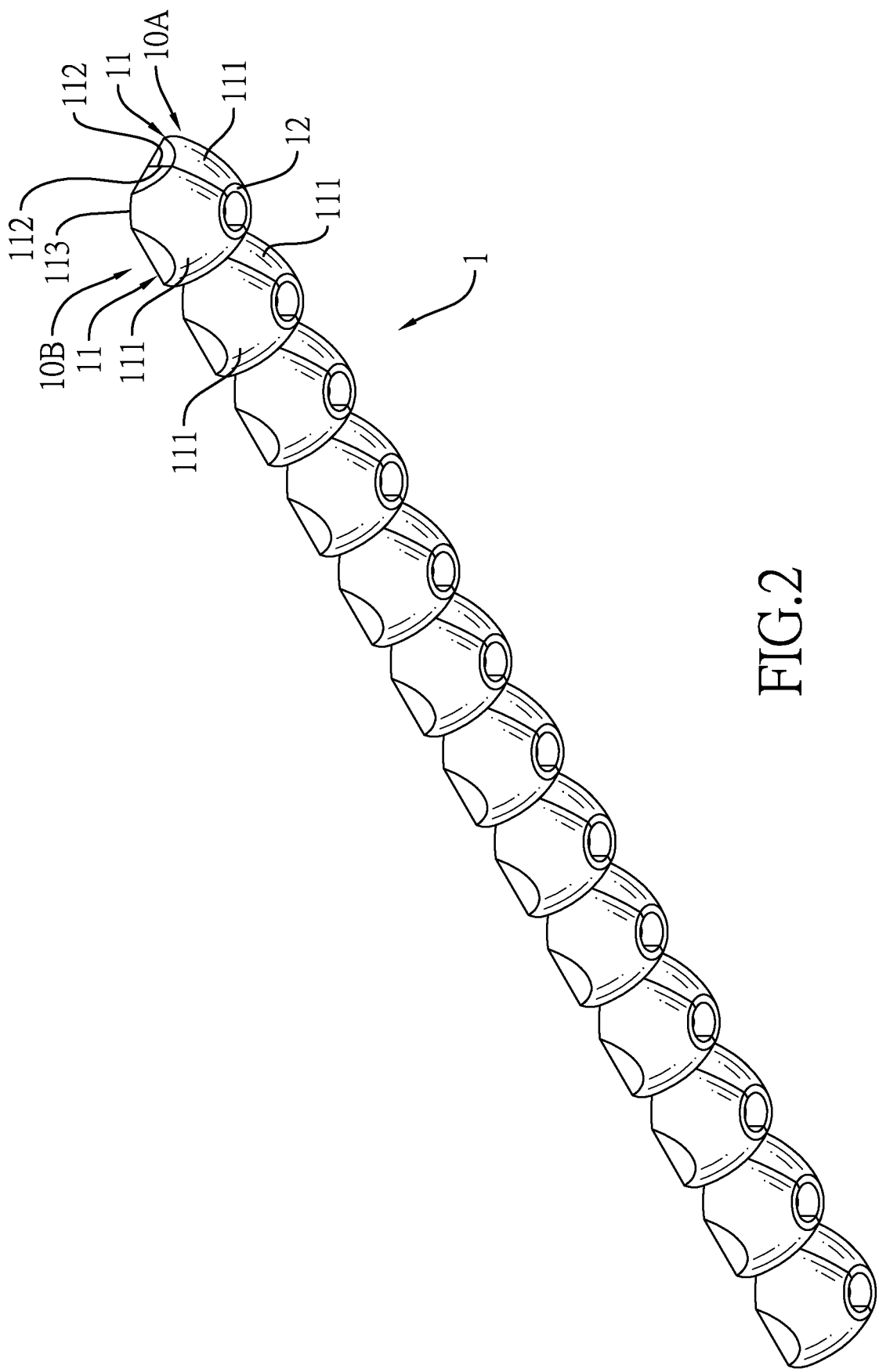
FIG. 2 is a perspective view of the combined optical assembly of alert light in FIG. 1.

With reference to FIGS. 1 and 2, a first embodiment of the optical assembly of alert light 1 in accordance with the present invention takes a straight-line and elongated form. The base 11 is integrally formed and has multiple half LED cases 111. The half LED cases 111 are continuously connected and aligned as a straight line along the optical reference plane. Each half LED case 111 takes the form of a semicircular cone with diameters of cross sections perpendicular to the junction planes of the two optical halves 10A, 10B progressively increasing in a direction from the light entrance portion 12 to the light exit portion 13. The light entrance portion 12 of each optical half 10A, 10B has multiple recessed entries 121. Each recessed entry 121 takes a semicircular form, is formed in one end of one of the half LED cases 111 with the smallest diameter in cross section, and has a quadra-spherical lens portion 122. The quadra-spherical lens portion 122 is formed on an inner wall of the recessed entry 121. Ends of each adjacent two of the half LED cases 111 with the largest diameter are integrally connected, and the end of each half LED case 111 has a light exit surface 131, which is planar or curved.

When the optical assembly of alert light 1 is arcuate and elongated, each optical half 10A, 10B takes an arcuate form by bending the light entrance portion 12 inwards or bending the light exit portion 13 outwards. With reference to FIG. 3, a second embodiment of an optical assembly of alert light 1 in accordance with the present invention takes a wavy form with each adjacent two sections of the light entrance portion 12 and light exit portion 13 respectively bent toward two opposite directions. The light exit portion 13 of the base 11 of each optical half 10A, 10B has multiple arcuate bumps 132 continuously formed on and arranged along the light exit portion 13.

With reference to FIGS. 4 and 5, a third embodiment of an optical assembly of alert light 1 in accordance with the present invention is shown. The base 11 of each optical half 10A 10B takes an annular form. The light entrance portion 12 of the base 11 is formed on an inner circumferential edge of the base 11, and has multiple recessed entries 121 formed in the light entrance portion 12 and mutually space apart by a gap. The light exit portion 13 of the base 11 is formed on an outer circumferential edge of the base 11, and has an annular half protrusion 133 formed around a periphery of the light exit portion 13 and is adjacent to the junction surface 112. The base 11 further has an annular flange 113 and a bevel annular wall 114. The annular flange 113 is formed on the annular half protrusion 133 and protrudes outwards in an axial direction. The bevel annular wall 114 is formed on an inner side of the annular flange 113 and protrudes inwards along a radial direction with diameters of cross sections of the bevel annular wall 144 reducing in a radial and inward direction. The annular flange 113 can function as the light exit portion 13, and the inner end of the bevel annular wall 114 with the smallest diameter in cross section can function as the light entrance portion 12.

Figure 6:
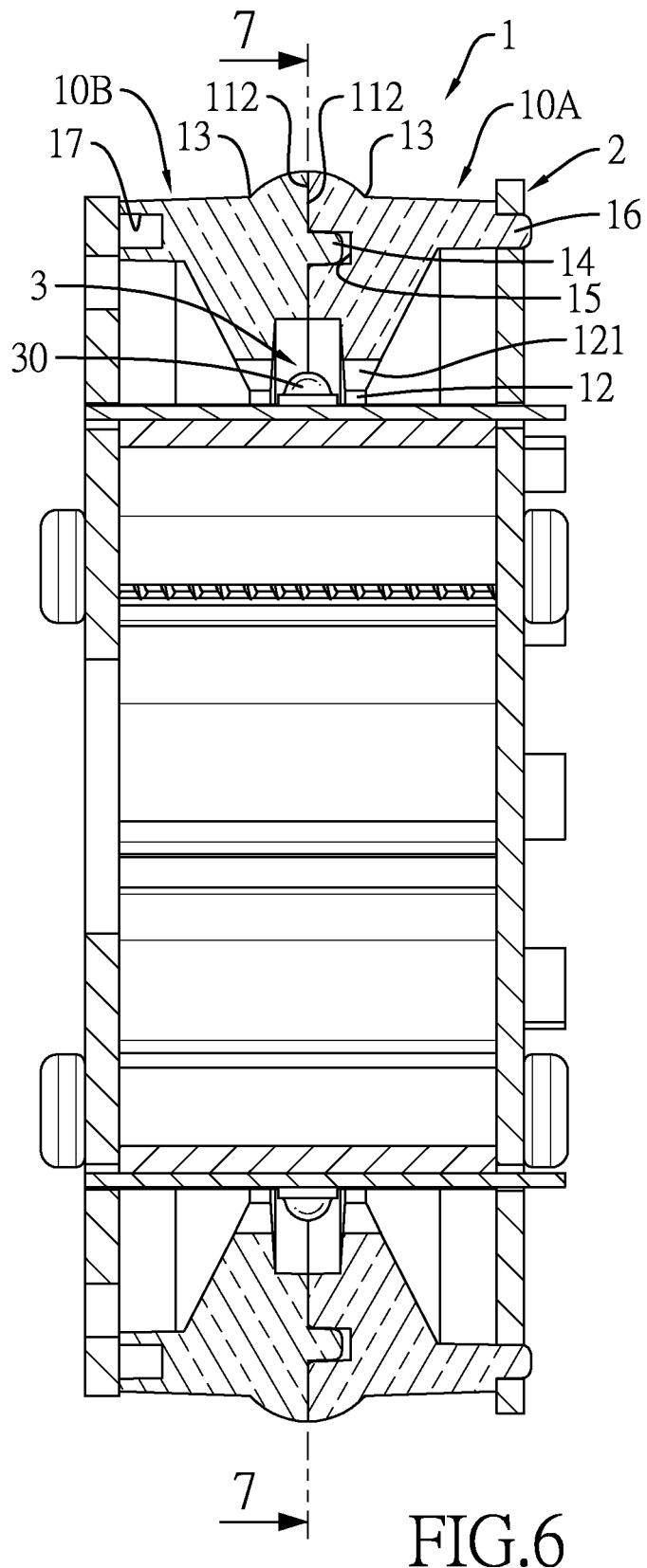
FIG. 6 is a cross-sectional side view of the optical assembly in FIG. 4 applied to an alert light.
Figure 8:
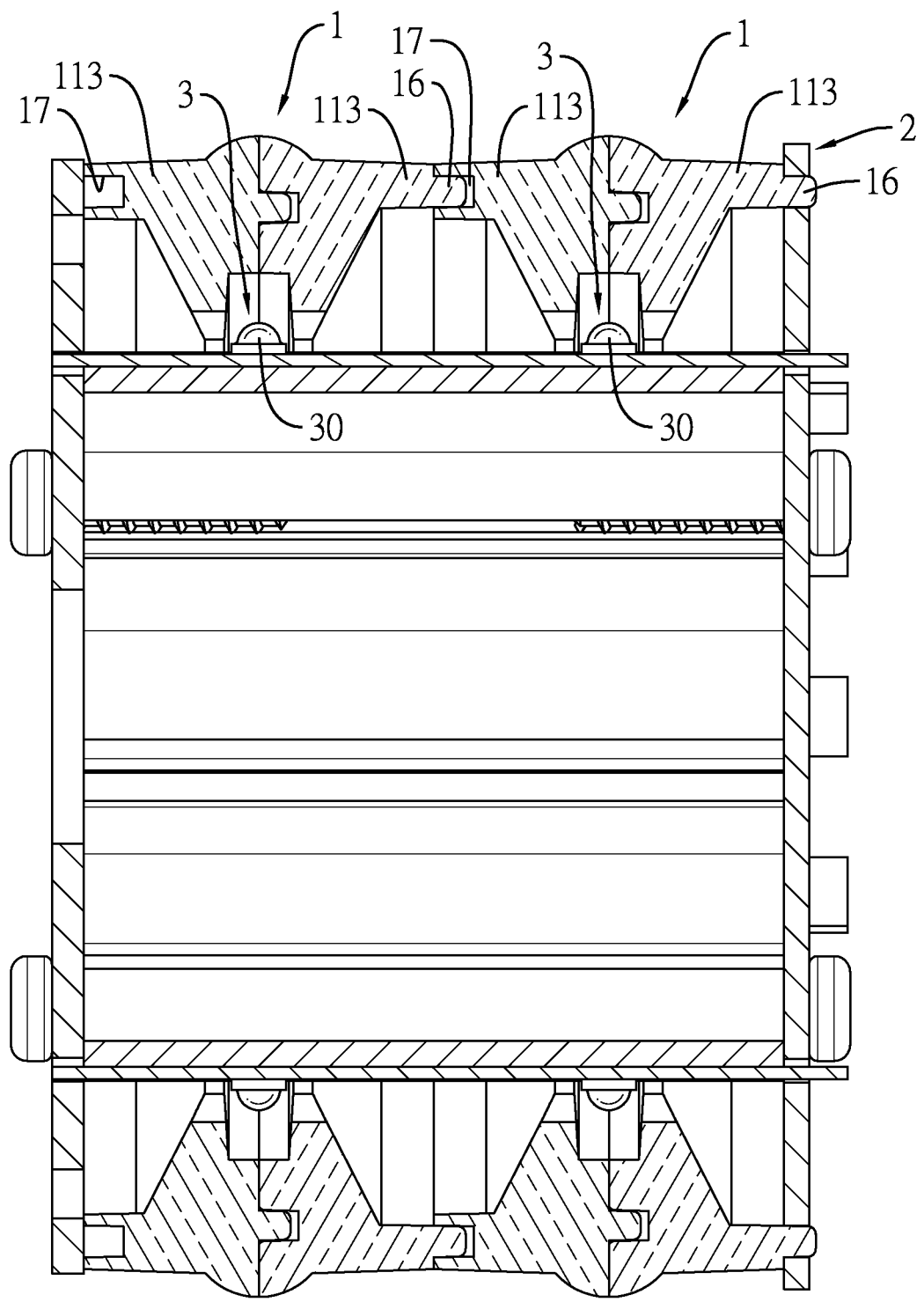
FIG. 8 is a cross-sectional side view of two of the optical assembly in FIG. 4 applied to an alert light.

With reference to FIGS. 4, 5 and 6, the optical halves 10A, 10B respectively have multiple lateral pins 16 and multiple lateral holes 17 respectively formed on and formed in edges of the annular flange 113 distal to the junction surfaces 112. The lateral pins 16 and the lateral holes 17 are used for assembling the optical assembly and a lamp holder 2 of the alert light. With reference to FIG. 8, multiple optical assemblies of alert light 1 are mounted inside the lamp holder 2 in a juxtaposed manner such that the lateral pins 16 and the lateral holes 17 of the bases 11 of the optical assemblies can be used to assemble the optical assemblies of the alert lights 1 together.

Figure 7:
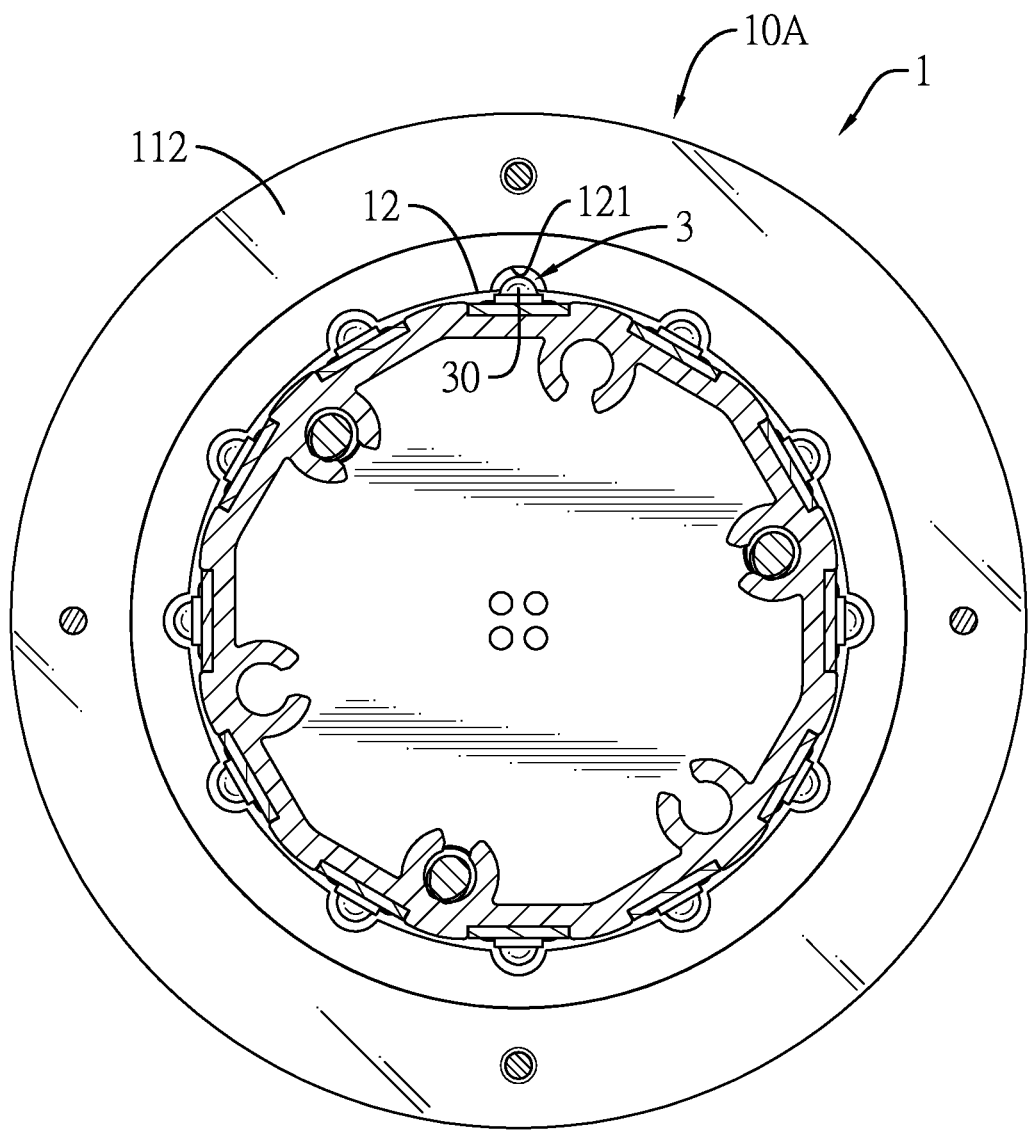
FIG. 7 is a cross-sectional side view of the optical assembly taken along the line 7 to 7 in FIG. 6.

With reference to FIGS. 4 to 7, given the annular optical assembly shown in FIG. 4 as an example, detailed description about assembly and operation of the optical assembly applied to an alert light is introduced as follows. The optical assembly formed by assembling the two optical halves 10A, 10B together is mounted inside the lamp holder 2. The annular light exit portion 13 of the optical assembly is exposed to an ambient environment. An LED module 3 is mounted inside the lamp holder 2 and is located inside the optical assembly. Each LED of the LED module 3 corresponds to the light entrance portions 12 of the two corresponding optical halves 10A, 10B. An annular alert light can be thus assembled. With reference to FIGS. 6 and 7, when the LED module is connected to a power source and the LEDs 30 are lighted up, light emitted from each LED 30 is scattered out through the light exit portions 13 of the bases 11 by propagating through corresponding recessed entries 121 and the bases 11 of the two optical halves 10A, 10B, so that the alert light demonstrates the light effect of an annular alert light.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An optical assembly of an alert light, comprising two optical halves obtained by symmetrically dividing the optical assembly along an optical reference plane, wherein
each optical half has:
a base taking an annular form, wherein one side of the base corresponding to the optical reference plane has a junction surface, and the two optical halves are assembled to form the optical assembly with the junction surfaces of the two optical halves attached to each other;
a light entrance portion formed on an inner circumferential edge of the base, adjoining the junction surface, and having multiple recessed entries formed in the light entrance portion and mutually spaced apart by a gap; and
a light exit portion formed on an outer circumferential edge of the base, adjoining the junction surface, and having an annular half protrusion formed around a periphery of the light exit portion and being adjacent to the junction surface;
wherein the base further has:
an annular flange formed on the annular half protrusion and protruding outwards in an axial direction of the base for light to exit from the annular flange; and
a bevel annular wall formed on an inner side of the annular flange and protruding inwards along a radial direction of the base with diameters of cross sections of the bevel annular wall reducing in a radial and inward direction of the bevel annular wall, wherein an inner end of the bevel annular wall has the smallest diameter in cross section for light to enter the bevel annular wall.

2. The optical assembly as claimed in claim 1, wherein the optical halves respectively have at least one first jointing member and at least one second jointing member respectively formed on at least one position on the base of one of the optical halves and on at least one position on the base of the other optical halve, each of the at least one first jointing member and each of the at least one second jointing member are respectively a raised portion and a recessed portion matching each other.

3. The optical assembly of alert light as claimed in claim 2, wherein the optical halves respectively have multiple lateral pins and multiple lateral holes respectively formed on and formed in edges of the annular flanges of the optical halves distal to the junction surfaces.

* * * * *